(No Model.)
F. N. ROOT.
VEHICLE STEP.
No. 547,158.  Patented Oct. 1, 1895.
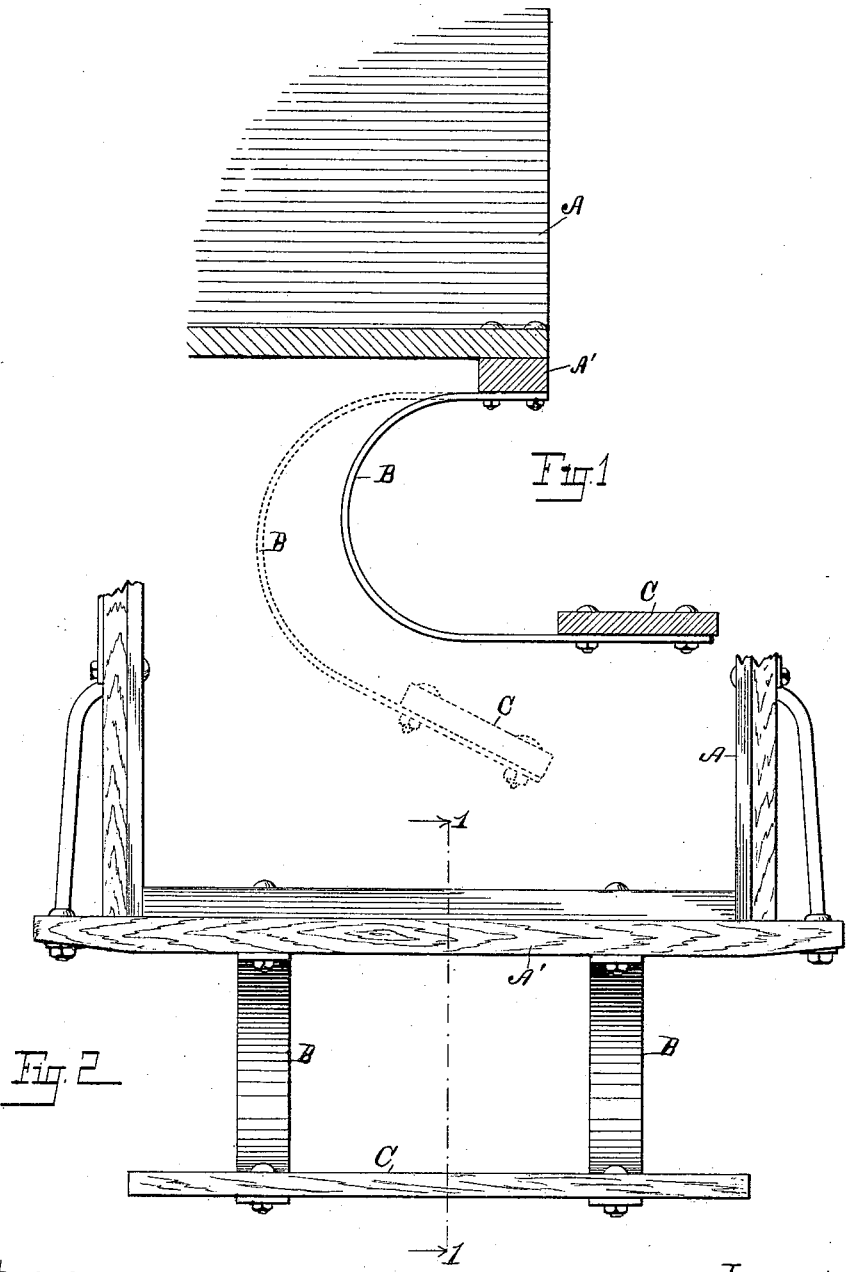
Witnesses:
Hatter S. Wood
Marian Longyear
Inventor.
Fred N. Root
By Fred L. Chappell
Att'y.

UNITED STATES PATENT OFFICE.

FRED N. ROOT, OF KALAMAZOO, MICHIGAN, ASSIGNOR OF ONE-HALF TO HORACE B. PECK, OF SAME PLACE.

VEHICLE-STEP.

SPECIFICATION forming part of Letters Patent No. 547,158, dated October 1, 1895.

Application filed May 25, 1895. Serial No. 550,604. (No model.)

*To all whom it may concern:*

Be it known that I, FRED N. ROOT, a citizen of the United States, residing at the city of Kalamazoo, in the county of Kalamazoo and State of Michigan, have invented certain new and useful Improvements in Vehicle-Steps, of which the following is a specification.

My invention relates to improvements in steps for vehicles, and more particularly to improvements in steps for the rear end of vehicles for use in ice-wagons, omnibuses, or any similar vehicle that may require such a step.

The objects of my invention are, first, to provide in a step for the rear of a vehicle a suitable spring connection which will yield when the wagon is backed up to a curbing, and in so yielding will serve as a stop to the wagon to prevent a heavy blow, and will also save the step from being broken or being bent out of shape; second, to provide a step which shall be comfortable for the attendant upon a wagon or omnibus to ride upon, yielding under his weight and preventing heavy jolting, thus preventing fatigue in connection with the same; third, to provide a step for a vehicle which will serve in use as a protection to the vehicle, and fourth, to provide in a spring-step for a vehicle a spring so formed that it shall always hold the step in proper position.

I accomplish these objects of my invention by the device shown in the accompanying drawings, in which—

Figure 1 is a sectional view on line 1 1 of Fig. 2, through the rear end of a wagon body and step, showing the features of my invention. Fig. 2 is a rear elevation of the step and a portion of the wagon-body.

In the drawings similar letters of reference refer to similar parts throughout the several views.

Referring to the lettered parts of the drawings, A represents the rear portion of the body of a wagon or omnibus or similar vehicle.

A' is the cross-bar under the end.

C represents the step.

The step is held in place by the springs B, which are secured by suitable bolts to the under cross-bar A', and extend under the body and then downwardly and outwardly in a curved line, substantially in a circle, and then extend to the rear and support the step C, which is bolted thereto securely.

A step for an ordinary ice-wagon to carry a single person at the rear should have springs of oil-tempered steel about three inches wide and three-eighths of an inch thick. Springs of this size will carry two persons to the rear of the wagon very comfortably, though better adapted for one, and will also serve as a very valuable assistance in stopping the wagon when it is backed to the curb by the step C striking the curb and springing forward as indicated by the dotted lines in Fig. 1, thus tending to stop the wagon gradually and preventing a heavy blow, which may injure the same. This step is a bumper for the wagon as well as a step, and by its position serves both these purposes.

Having thus described my improved step, I desire to say that it can be considerably varied without departing from my invention. The exact style of spring B can be changed for other forms, although the construction I have shown is particularly well adapted to the uses intended and supports the step at the proper angle under a load. As I have intimated above, this step can be used on omnibuses, carryalls, and delivery-wagons of any description where it is desirable to have a step to the rear of the wagon and will in those places prove especially serviceable in the manner I have above indicated.

Having thus described my invention, what I claim as new, and desire to secure by Letters Patent, is—

1. The combination, with the rear end of a wagon body, of the step, C, and curved springs, B, attached by suitable means to the wagon body and extending forwardly and downwardly and then rearwardly under the step to support the same, and serve as a bumper for the wagon as specified.

2. The combination with the wagon body, A, of the curved springs, B, secured thereto; a step, C, supported by said springs to the rear of the wagon body, to serve as a bumper, as well as a step, as specified.

3. The combination, with the wagon body, of a step below and to the rear of the same; a suitable spring connection from the step to the wagon body to support it yieldingly in position, to protect the step, and serve as a bumper, as specified.

In witness whereof I have hereunto set my hand and seal in the presence of two witnesses.

FRED N. ROOT. [L. S.]

Witnesses:
MARIAN I. LONGYEAR,
WALTER S. WOOD.